Figure 1:
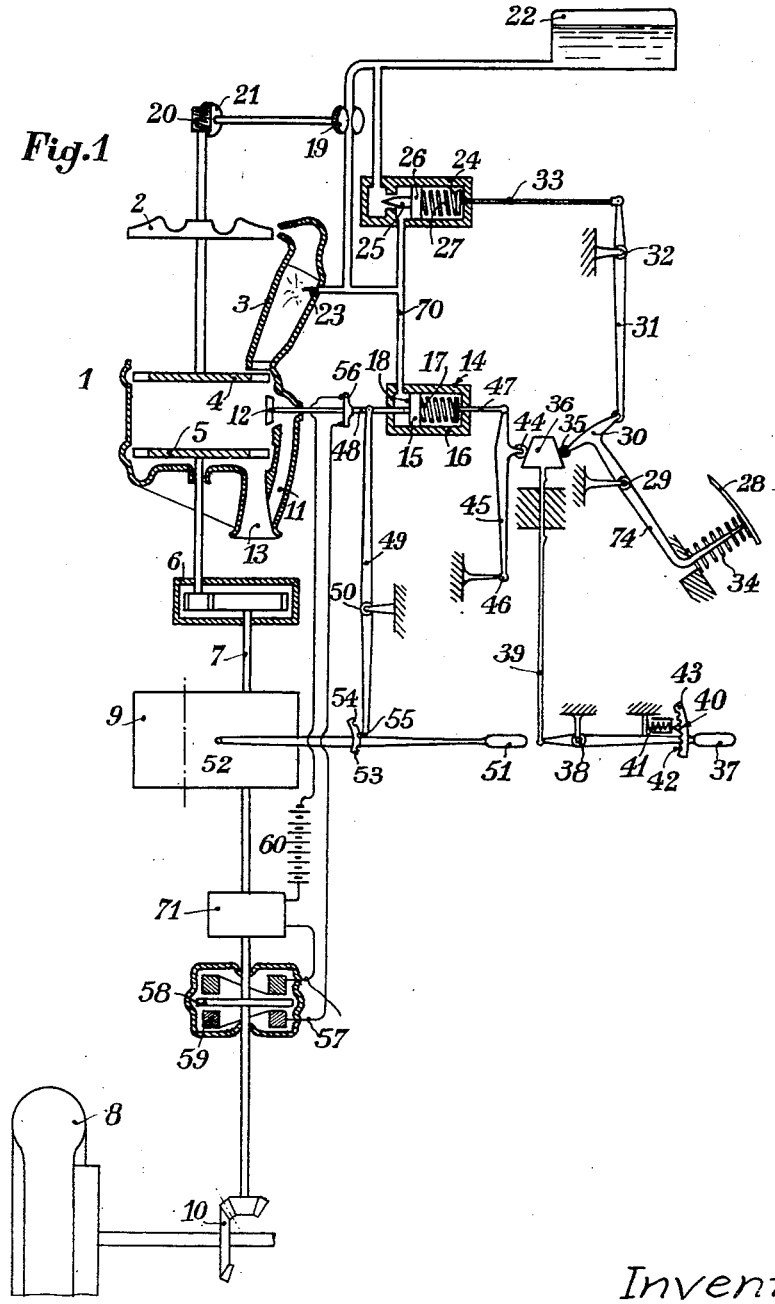

Dec. 21, 1954   P. DESTIVAL   2,697,492
MECHANISM FOR REGULATING INTERNAL-COMBUSTION TURBINES
Filed Jan. 29, 1952   2 Sheets-Sheet 1

Inventor
Pierre Destival
By Robert E. Burns
Attorney

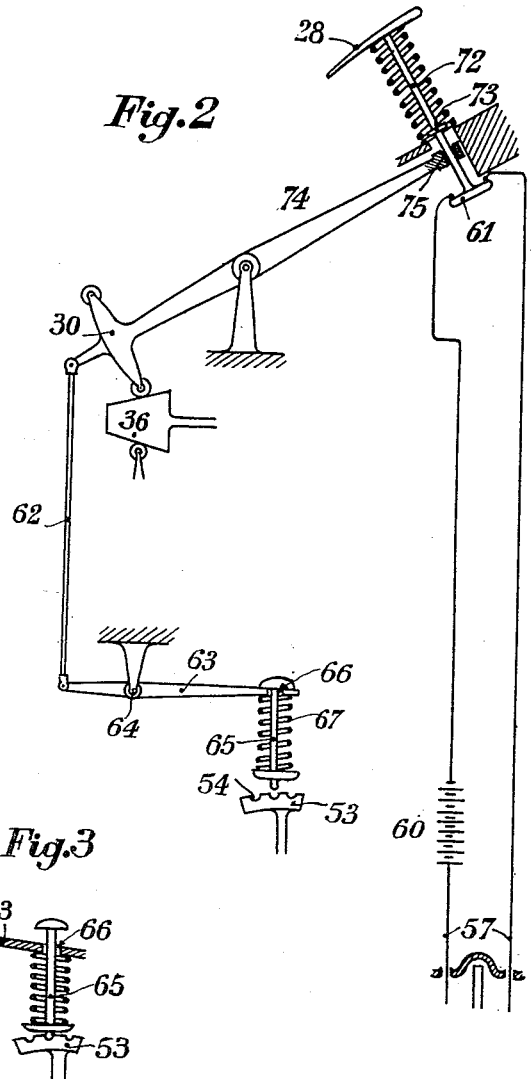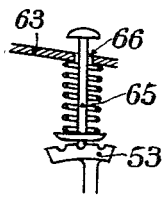

2,697,492

MECHANISM FOR REGULATING INTERNAL-COMBUSTION TURBINES

Pierre Destival, Paris, France, assignor to Société Anonyme dite: Compagnie Electro-Mecanique, Paris, France Application January 29, 1952, Serial No. 268,728

Claims priority, application France February 15, 1951

7 Claims. (Cl. 180—66)

Generally, such internal combustion turbines as are designed to drive automobiles comprise a turbo-compressor unit and a driving turbine which is mechanically independent of said unit. Such an arrangement has already been used in other applications of the internal combustion turbine; however, in the matter of propelling an automobile, the working conditions impose particular requirements upon the control and the regulation of the prime mover as a whole.

The present invention is concerned with a means for so controlling and regulating the operation of an internal combustion turbine of the kind set forth as to make it best suitable for the propulsion of an automobile. The invention is characterized by the use of a by-pass whereby it becomes possible, as desired, to shunt gases directly from the compressor-driving turbine exhaust to driving turbine exhaust, means responsive to the displacements of the by-pass closing members being provided to prevent any one of the turbines from racing consequnent to faulty operation.

First of all, such a by-pass will facilitate the starting of the turbo-compressor unit, in addition to which it will make it possible to nullify the driving torque of the driving turbine whenever the turbo-compressor unit is running idle. Said by-pass will be closed automatically through the medium of a power relay as soon as the driver depresses the throttle pedal. Last, it will make it possible to keep the driving engine idling while the turbo-compressor unit is running at a comparatively high speed whenever it is desired to secure quick starts or pick-ups.

Generally, a change-speed gear is interposed between the driving turbine and the wheels of the vehicle. In order to prevent said driving turbine from undesirably racing in the case e. g. in the event the driver should change gear while omitting to previously throttle the gas, a gear change lever locking device is provided which is so arranged that said lever cannot be actuated unless the by-pass is open.

Likewise, a vehicle driven by an internal combustion turbine will generally be provided with decelerating means similar to the ones already in use on a number of heavy cars, in view of the fact that following the throttling of the gas to the driving turbine the resisting torque opposed by the same becomes very low. Such a decelerating device may also be set into action as soon as the by-pass is opened and out of action as soon as same is closed.

A diagram of the means to regulate the operation of an internal combustion engine provided with a by-pass according to the invention is represented by way of example in Fig. 1 of the drawings appended hereto. Figs. 2 and 3 illustrate a modification of the means to lock the change-speed lever and to actuate the decelerating means.

As shown in Fig. 1, 1 designates the internal combustion turbine as a whole, which comprises a compressor 2 (here a 1-stage centrifugal compressor), the combustion chamber 3 (or one of them), a compressor-driving turbine 4, a wheel-driving turbine 5, both of said turbines being assumed to be single-stage turbines. The driving turbine 5 drives a reducing gear 6 the second motion shaft 7 of which in its turn drives the driving wheels, of which a single one is represented at 8, and this, through the medium of a change-speed gear 9 and a bevel gear set 10 including a conventional differential gear (not shown). Said change-speed gear is assumed to be of a conventional type in which the pinion synchronizing mechanism is sufficiently effective to make the provision of a clutch unnecessary. According to the invention, the turbine is provided with a by-pass 11 the access to which is controlled e. g. by means of a valve 12 and through which gases can be led from a point below turbine 4 past turbine 5 directly into the exhaust 13 of the latter, whereby the loss of head through said turbine is reduced to that which attends the flow of gases through the by-pass.

The valve 12 is actuated by means of a power relay 14 which consists of a piston 15 movable in a cylinder 16 and restored to the position corresponding to the open position of valve 12 by a spring 17. The pressure of the fuel supplied to the combustion chamber 3 and which prevails in the pipe 70 acts upon the inside face 18 of piston 15.

The fuel is supplied e. g. by means of a gear pump 19 driven by the turbo-compressor unit through a worm spindle 20 and a worm wheel 21. The said pump sucks the fuel from the reservoir 22 and forces it on the one hand through an injector 23 into the combustion chamber 3 and on the other hand to a pressure-regulating device 24 which comprises a relief needle-valve 25 rigid with a piston 26 which is acted upon on that side thereof which carries the needle by the pressure of the fuel and on its opposite face by a spring 27 the tension of which is adjustable. The tension of said spring depends upon the position of the throttle pedal actuated by the driver, said pedal being rigid with a lever 74 pivoted at 29 which through its arms 30 and a lever 31 pivoted at 32 and through the rod 33 influences the tension of the spring 27.

The throttle pedal 28 is urged towards its position corresponding to the minimum tension of spring 27, that is, to the minimum fuel pressure at the delivery side of pump 19, by means of a spring 34. The displacement of said pedal is in the direction corresponding to the minimum fuel pressure by a follower 35 which cooperates with a cam 36. The latter can be displaced at the driver's will with the aid of a lever 37 pivoted at 38 and a rod 39. The lever is arrested in the selected position with the aid of a ratchet including a ball 40 loaded by a spring 41 and cooperating with notches 42 provided in a sector 43 rigid with the lever 37. The purpose of the displacement of the cam 36 by means of lever 37 is to modify the position of pedal 28 corresponding to idling operation, and consequently to change the rotational speed of the turbo-compressor unit which corresponds to such an idling operation.

The cam 36 is also adapted, through the medium of a follower 44, a lever 45 pivoted at 46 and a rod 47, to influence the pre-stress on spring 17 of the power relay 14. Cam 36 is so designed that, irrespective of the idle-operation R. P. M. of the turbo-compressor, the valve 12 will be open at the fuel pressure corresponding to said idling operation and will close as soon as more gas is given by the driver.

The rod 48 by which the power relay 14 is operatively connected with valve 12 also actuates a lever 49 pivoted at 50 the purpose of which is to lock or release the change-speed lever 51. According to a conventional arrangement, said lever is adapted to actuate the gear wheel trains in the change-speed gear box 9 so as to give the desired ratio of transmission. The lever 51 pivoted at 52 in the gear box is provided with a sector 53 formed with notches 54; the bent out end 55 of lever 49 will come into engagement with one of the aforesaid notches 54 whenever such a fuel pressure prevails that the valve 12 is closed by the power relay 14; thereby, it becomes impossible to actuate lever 51. Conversely, upon the power relay 14 shifting valve 12 open, the end 55 of lever 49 will be disengaged from the notches 54 and it will become possible to actuate the lever 51. In the event the driver should mistakenly leave lever 51 in a position corresponding to a dead point and then depress the throttle pedal 28, the end 55 of lever 49 would engage the sector 53 between two successive notches, when lever 49 would prevent valve 12 from closing. In this manner, any undesired racing of the wheel-driving turbine is avoided. After all, in order to limit the dangers of such faulty operations, the change-speed gear box may be provided with known locking means devoid of notches at the dead points.

The rod 48 also actuates a switch 56 adapted to open and close the electric supply circuit feeding an electric decelerator 57 of known type which may consist e. g. of a magnetic disc 58 mounted for rotational motion between pole pieces provided with an excitation winding 59, the excitation circuit being fed from a storage battery 60. In the open position of valve 12 the contact 56 closes the circuit for the decelerator; conversely, in the closed position of valve 12, said circuit is broken at contact 56. In order to avoid that at rest current is uselessly consumed by the decelerator 57, the circuit is led through a centrifugal switch 71 of known type. Said switch is arranged to break the circuit at rest and at low running speeds and to close it as soon as the speed of the vehicle reaches a definite value.

As shown in Fig. 2, the throttle pedal is arranged to directly actuate a switch 61 adapted to close the excitation circuit for the decelerator 57 as long as said pedal is not depressed by the driver. This result is obtained, irrespective of the idling value elected, through the medium of the stem 72 which carries the pedal 28 at the one end thereof and the switch 61 at its opposite end. Said stem is slidable in an eye 75 provided at the end of lever 74 and is arranged to act thereon by means of a shoulder 73. Conversely, the excitation circuit for the decelerator is broken as soon as the driver depresses the throttle pedal.

The centrifugal switch 71 visible in Fig. 1 is not shown in Fig. 2, although it may as well be used in the arrangement shown in the latter.

In Fig. 2 there is also provided that the locking of the change-speed lever is obtained directly in dependency on the position of the throttle pedal. With this end in view, a rod 62 pivoted to lever 30 is arranged to actuate a lever 63 pivoted at 64 so as to lock the sector 53 of the change-speed lever (not shown in Fig. 2) through the medium of a stem 65 the end of which engages such notches as 54. The stem 65 is slidably mounted in an eye 66 provided in the free end of lever 63 and is kept in the position illustrated in Fig. 2 when not in engagement with the sector 53. As soon as the throttle pedal 28 is depressed by the driver the end of stem 65 enters a notch 54, and as the pedal is further depressed the spring 67 is compressed while the stem 65 will move through the eye 66. Fig. 3 shows the relative positions of stem 65 and lever 63 in the end position of throttle pedal which correspond to maximum fuel supply.

The operation is as follows: It will be assumed that the turbine 4 which drives the compressor 2 is already started and that the combustion chamber or chambers 3 are already ignited by known means which are not shown in the diagrammatical figure. It being also assumed that said turbine 4 is running at idling speed, which is determined by the position of pedal 28 which in turn is determined by the position of lever 37, valve 12 is open and the gases will flow out directly through the by-pass 11, which means that no appreciable torque is exerted by the driving turbine 5 upon the shaft line.

Consequent to the depression of the pedal 28 by the driver, the spring 27 of the pressure-regulating device 24 is compressed and the fuel pressure on the delivery side of the pump is increased, with the result that the valve 12 is closed by the action of the power relay 14 at the same time as the speed of the turbo-compressor unit is accelerated. The driving turbine 5 will then exert an appreciable torque upon the shaft line. Besides, consequent to the closing of the valve 12, the excitation circuit for the decelerator 57 is broken at 56.

Conversely, upon the driver allowing the throttle pedal 28 to come back to idling position, the fuel pressure will be brought back to the value corresponding to idle running through the pressure-regulating device 24; the turbo-compressor unit will slow down and the valve 12 will be thrown open again, with the result that the switch 56 is closed by which the decelerator 57 is set into action until the running speed of the vehicle has decreased sufficiently to cause the centrifugal switch 71 to switch out the decelerator 57 in order to avoid power being uselessly consumed at very slow running speeds or when the vehicle is standing still.

In order to prevent either the turbo-compressor unit or the driving turbine from racing in the event any of the safety devices provided according to the invention should fail, both the turbo-compressor unit and the driving turbine are provided each with a speed-limiting device of known type adapted to cut out the supply of fuel to the combustion chamber whenever the allowed top speed is exceeded.

It remains within the scope of the invention to actuate the by-pass controlling member by other means than the one described, whether it be of mechanical, hydraulic or electrical character, provided it will be adapted to cut out the flow through said by-pass as soon as a driving torque is awaited from the turbine and to restore it once such a torque has become unnecessary. The same holds good as to the design of the means for locking the change-speed lever and the decelerator switch-in device in dependency on either the position of the throttle pedal or that of the by-pass controlling valve.

What I claim is:

1. An internal combustion turbine for use on a vehicle which includes a turbo-compressor unit the turbine of which is supplied from a combustion chamber and a driving turbine mechanically independent of said turbo-compressor unit and supplied with the compressor turbine exhaust gases, control and regulating means comprising at least one by-pass through which gases tapped from the outlet of the compressor turbine can be led directly into the outlet of the driving turbine, a valve adapted to stop or clear the passage through said by-pass and a power relay actuating said valve and adapted to close the valve upon the pressure of the fuel reaching a predetermined value, said power relay comprising a cylinder, a piston slidably received in said cylinder, a spring urging said piston to open the valve and means to cause the pressure of the fuel to act upon the opposite face of the piston in the direction corresponding to the closed position of the valve, a pump driven by the turbo-compressor adapted to supply fuel to the combustion chamber, a pressure regulator with a relief needle-valve adapted to limit the pressure of the fuel discharged by said pump, said regulator comprising a cylinder, a piston slidably received therein, a spring urging said piston to close the needle valve and means to cause the pressure of the fuel to act upon the opposite face of the piston in the direction corresponding to the open position of the needle valve, an idling control cam and means to cause said cam to simultaneously increase or decrease the initial stresses on the springs of the power relay and of the regulator respectively.

2. An internal combustion turbine for use on a vehicle which includes a turbo-compressor unit the turbine of which is supplied from a combustion chamber and a driving turbine mechanically independent of said turbo-compressor unit and supplied with the compressor turbine exhaust gases, control and regulating means comprising at least one by-pass through which gases tapped from the outlet of the compressor turbine can be led directly into the outlet of the driving turbine and means responsive to the pressure of the fuel supplied to the combustion chamber adapted to automatically stop or clear the passage for said gases through said by-pass in combination with a change-speed gear between the motor shaft of the turbine and the driving wheels of the vehicle and with means to lock said change-speed gear, wherein the means responsive to the pressure of the fuel supplied to the combustion chamber and automatically stopping or releasing the flow of gases through the by-pass are adapted to lock the change-speed gear locking means when said locking means stop the flow of gases through the by-pass and to unlock them when same release the flow of gases through said by-pass.

3. An internal combustion turbine for use on a vehicle which includes a turbo-compressor unit the turbine of which is supplied from a combustion chamber and a driving turbine mechanically independent of said turbo-compressor unit and supplied with the compressor turbine exhaust gases, control and regulating means comprising at least one by-pass through which gases tapped from the outlet of the compressor turbine can be led directly into the outlet of the driving turbine and means responsive to the pressure of the fuel supplied to the combustion chamber adapted to automatically stop or clear the passage for said gases through said by-pass in combination with a change-speed gear between the motor shaft of the turbine and the driving wheels of the vehicle, means to actuate said change-speed gear, means to lock the means responsive to the pressure of the fuel supplied to the combustion chamber and adapted to automatically stop or clear the passage for the gases through the by-pass in that position of said pressure-responsive means corresponding to free flow through the by-pass and means operatively connected with the change-speed gear actuating means adapted to automatically lock the aforesaid locking means in their inoperative position when the change-speed gear is in one of its operative positions and to release said locking means when the change-speed gear is in free-running position.

4. An internal combustion turbine for use on a vehicle which includes a turbo-compressor unit the turbine of which is supplied from a combustion chamber and a driving turbine mechanically independent of said turbo-compressor unit and supplied with the compressor turbine exhaust gases, control and regulating means comprising at least one by-pass through which gases tapped from the outlet of the compressor turbine can be led directly into the outlet of the driving turbine and means responsive to the pressure of the fuel supplied to the combustion chamber adapted to automatically stop or clear the passage for said gases through said by-pass in combination with a decelerator adapted to act upon the motor shaft of the turbine, means to switch in said decelerator when said means responsive to the pressure of the fuel supplied to the combustion chamber are set to allow the gases to flow freely through the by-pass and to make it inoperative when said means are set to close the passage of the gases through the by-pass.

5. A turbine according to claim 4 which includes means controlled by the motor shaft of the turbine and adapted to lock the decelerator switch-in means as soon as the said motor shaft rotates at a speed less than a predetermined value.

6. An internal combustion turbine for use on a vehicle which includes a turbo-compressor unit the turbine of which is supplied from a combustion chamber and a driving turbine mechanically independent of said turbo-compressor unit and supplied with the compressor turbine exhaust-gases, control and regulating means comprising at least one by-pass through which gases tapped from the outlet of the compressor turbine can be led directly into the outlet of the driving turbine and means responsive to the pressure of the fuel supplied to the combustion chamber adapted to automatically stop or clear the passage for said gases through said by-pass in combination with a change-speed gear arranged between the motor shaft of the driving turbine and the driving wheels of the vehicle, means to actuate said change-speed gear, a pedal actuating means to control the flow of fuel to the turbo-compressor unit and means operatively connected with said pedal to lock the change-speed gear actuating means as soon as said pedal is depressed.

7. An internal combustion turbine for use on a vehicle which includes a turbo-compressor unit the turbine of which is supplied from a combustion chamber and a driving turbine mechanically independent of said turbo-compressor unit and supplied with the compressor turbine exhaust-gases, control and regulating means comprising at least one by-pass through which gases tapped from the outlet of the compressor turbine can be led directly into the outlet of the driving turbine and means responsive to the pressure of the fuel supplied to the combustion chamber adapted to automatically stop or clear the passage for said gases through said by-pass in combination with a decelerator adapted to act upon the motor shaft of the driving turbine, means to actuate said decelerator, a throttle pedal controlling the supply of fuel to the turbo-compressor unit and means to lock the decelerator-actuating means as soon as the throttle pedal is depressed and to release them as soon as said pedal comes back to its original position.

References Cited in the file of this patent

UNITED STATES PATENTS

| Number | Name | Date |
|---|---|---|
| 2,219,994 | Jung | Oct. 29, 1940 |
| 2,565,854 | Johnstone et al. | Aug. 28, 1951 |
| 2,587,057 | McVeigh | Feb. 26, 1952 |
| 2,604,756 | Greenland | July 29, 1952 |